April 19, 1932.  H. W. GOODALL ET AL  1,854,651

VALVE HANDLE CONSTRUCTION

Filed April 30, 1930

WITNESS:
Robt R Kitchel.

INVENTORS
Joseph W. Walsh and
Howard W. Goodall
BY Augustus B. Stoughton.
ATTORNEY.

Patented Apr. 19, 1932

1,854,651

UNITED STATES PATENT OFFICE

HOWARD W. GOODALL, OF ALDAN, AND JOSEPH W. WALSH, OF PHILADELPHIA, PENNSYLVANIA

VALVE HANDLE CONSTRUCTION

Application filed April 30, 1930. Serial No. 448,475.

Valves are frequently subjected to violent and sustained vibratory movement, for example, when used with pneumatic tools or drills, with the result that the handle is detached from the plug.

It is the principal object of the present invention not only to avoid and prevent detachment of the handle but also to obtain the benefits incident to the use of brass or like plugs in iron or like casings.

Figure 2:
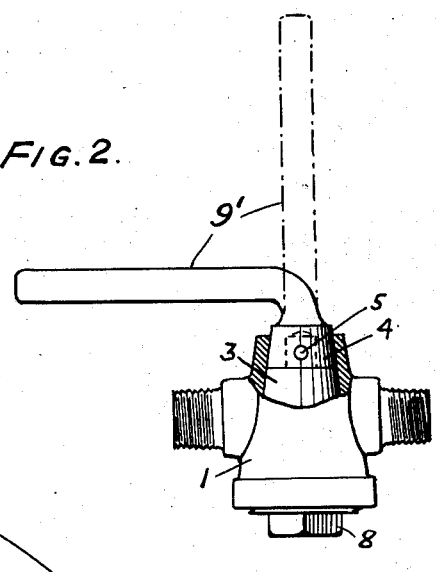
Figure 1:
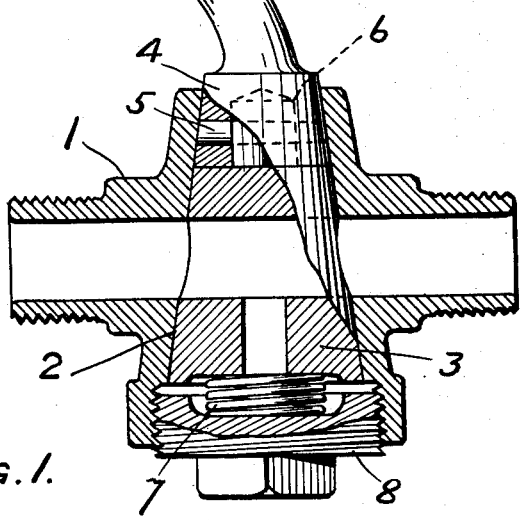

Other objects of the invention will appear from the following description at the end of which the invention will be claimed. However, the invention will be first described in connection with the accompanying drawings forming part hereof and in which Figure 1 is a view principally in central section but with parts in elevation of a valve handle construction embodying features of the invention, and Fig. 2 is a similar view illustrating a modification.

Referring to the drawings 1 is a casing as of iron having a tapering bore or opening 2 extending through it. The casing is also provided with the usual fluid ways. 3 is a tapering plug as of brass arranged in the casing 1 and stopping short of the small end of the bore or opening 2. The tapering plug is provided with the usual fluid way. 4 is a tapering plug extension, as of iron, and it is mounted in the small end of the tapering bore or opening. This tapering plug extension 4 is provided with an iron handle constituting with the extension a one piece structure. A cross pin 5 and a dowel pin 6 are arranged between the extension 4 and the plug 3 for the purpose of securing them together. The ends of the cross pin 5 are confined by the curved wall of the bore of the casing so that when the parts are assembled and the structure submitted to vibration the pin 5 may not be dislodged and therefore the handle may not be shaken loose or detached. The spring 7 and cap 8 are usual provisions of a valve. To assemble the parts, the handle 9 may be curved substantially as shown in Fig. 1, so that it with the plug 3 attached, can be threaded or passed through the opening in the casing prior to the assembly of the spring 7 and cap 8. As shown in Fig. 2 the handle 9' is in the position indicated by the dash and dot lines until after assembly and it is then bent into the position substantially as shown by full lines. In the construction of Fig. 1 the handle and its plug extension constitute a unitary forging and as shown in Fig. 2 the unitary element may be made upon a lathe.

In the description and claims the words non-ferrous material is used to include brass or bronze and the words ferrous material is used to include iron or steel.

We claim:

1. A valve handle construction adapted to withstand vibration and comprising an iron valve casing having through it a tapering bore, a brass tapering plug arranged in the casing and stopping short of the small end of the bore, an iron tapering plug extension mounted on the small end of the tapering plug and in the tapering bore so as to be retained by said casing in said bore and having an iron handle constituting with the extension a one piece structure, and a cross pin and a dowel pin between the extension and plug, the ends of the cross pin being confined by the curved wall of the bore.

2. A valve having a casing provided with a tapering bore, a tapering plug of brass extending partway through the bore, a handle of iron having a plug extension arranged in the bore and held in the casing by the curved wall of the bore, and means for connecting the handle extension and plug.

3. A valve having a casing provided with a tapering bore, a tapering plug of non-ferrous material extending part way through the bore, a handle of ferrous material having a plug extension arranged in the bore and held in the casing by the curved wall of the bore, and means for connecting the handle extension and plug.

HOWARD W. GOODALL.
JOSEPH W. WALSH.